United States Patent
Altic et al.

[19]

[11] Patent Number: 5,973,920
[45] Date of Patent: Oct. 26, 1999

[54] HEAT FRAME FOR PORTABLE COMPUTER

[75] Inventors: James E. Altic, Belton; Rex A. Karl; Samuel L. Vinson, both of Temple, all of Tex.

[73] Assignee: Texas Instruments Incorporated, Dallas, Tex.

[21] Appl. No.: 08/656,800

[22] Filed: May 31, 1996

[51] Int. Cl.⁶ ............................... G06F 1/20; H05K 7/20
[52] U.S. Cl. .................... 361/687; 361/707; 165/80.2
[58] Field of Search ................... 361/687–690, 361/701, 702, 703, 704, 707–711, 712–723; 364/708.1; 165/80.2, 80.3, 104.33, 185

[56] References Cited

U.S. PATENT DOCUMENTS

| | | | |
|---|---|---|---|
| 5,237,486 | 8/1993 | LaPointe et al. | 361/681 |
| 5,311,397 | 5/1994 | Harshberger et al. | 361/683 |
| 5,313,362 | 5/1994 | Hatada et al. | 361/709 |
| 5,424,913 | 6/1995 | Swindler | 361/687 |
| 5,513,070 | 4/1996 | Xie et al. | 361/700 |
| 5,550,710 | 8/1996 | Rahamim et al. | 361/687 |
| 5,552,960 | 9/1996 | Nelson et al. | 361/687 |
| 5,557,500 | 9/1996 | Baucom et al. | 361/687 |
| 5,559,675 | 9/1996 | Hsieh et al. | 361/707 |
| 5,588,483 | 12/1996 | Ishida | 165/86 |
| 5,598,320 | 1/1997 | Toedtman et al. | 361/687 |
| 5,612,852 | 3/1997 | Leverault et al. | 361/687 |
| 5,646,822 | 7/1997 | Bhatia et al. | 361/687 |
| 5,673,176 | 9/1997 | Penniman et al. | 361/687 |
| 5,694,294 | 12/1997 | Ohashi et al. | 361/687 |
| 5,712,762 | 1/1998 | Webb | 361/687 |

FOREIGN PATENT DOCUMENTS 1438609 6/1976 United Kingdom ................. 361/687

*Primary Examiner*—Lynn D. Feild
*Attorney, Agent, or Firm*—Ronald O. Neerings; Richard L. Donaldson

[57] ABSTRACT

A heat frame (10) incorporates a mounting frame for mounting multiple circuit boards (38), a heat sink (24), a connector bracket (34), and hinge mounts (12) into one integral component. Heat removed by the heat sink (24) is transferred over the entire heat frame (10) with the aid of a heat pipe (44). Fins 17 dissipate heat through the housing of computer (50) under the display assembly (74). The integral nature of the heat frame (10) reduces assembly and testing costs, as well as providing superior heat transfer and EMI/RFI grounding.

14 Claims, 6 Drawing Sheets

HEAT FRAME FOR PORTABLE COMPUTER

BACKGROUND OF THE INVENTION

1. Technical Field

This invention relates in general to computers and, more particularly, to a heat frame for use in a portable computer.

2. Description of the Related Art

For many years, the popularity of portable computers has risen as the size and weight of the portable computer has been reduced. Early portable computers were known as "luggable" computers, since they could be transported, but were only slightly smaller and lighter than comparable desktop computers. "Laptop" computers were smaller and lighter, but generally had reduced features and flexibility because most of the circuitry needed to be designed into the laptop motherboard without the option of expansion boards.

"Notebook" computers are significantly smaller and lighter than laptop computers. These computers can be carried easily in a briefcase. Two of the most important considerations in the usability of a notebook are the weight and thickness of the computer. It is very desirable to have a light, thin notebook computer.

One problem in weight and thickness reduction is their effect on cooling the internal components, especially the microprocessor. This is especially problematic with the move to higher frequency microprocessors which generate additional heat. To remove heat from the microprocessor, many prior art designs mount a heat sink opposite the microprocessor on a circuit board. Thermal vias are formed in the circuit board below the microprocessor to draw heat from the microprocessor to the heat sink. The heat sink dissipates heat to the area surrounding the microprocessor, which often causes hot spots to occur in areas of the housing which contact the user. Further, with little air movement within the housing, the heat transfer can be ineffective for high speed microprocessors.

Another option to remove heat is to attach a fan to the microprocessor to draw cool air over the microprocessor. While this technique is used in desktop machines in conjunction with high speed microprocessors, it is generally undesirable in notebook designs because of the additional space required by the fan. Additionally, the fan generates noise and uses additional power, neither of which is desirable in a notebook computer.

Therefore, a need has arisen for a more efficient and cost effective heat transfer mechanism.

SUMMARY OF THE INVENTION

The present invention provides a portable computer including plurality of circuit boards mounted on a heat frame formed of an integral piece of material. A portion of the heat frame is thermally coupled to a processor for removing heat therefrom and spreading the heat throughout the heat frame. A housing contains the heat frame and circuit boards.

The present invention provides significant advantages over the prior art. First, concentrations of heat around components such as the microprocessor are spread out over a large surface area to prevent hot spots. Second, the heat frame draws heat away from areas which may be in contact with the user, such as the bottom surface of the housing which may rest on the user's lap. Third, heat is dissipated to the air in areas which are generally inaccessible to the user. Fourth, the heat frame reduces assembly and testing costs. Fifth, the heat frame provides a superior EMI/RFI ground plane.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENT

The present invention is best understood in relation to FIGS. 1–5 of the drawings, like numerals being used for like elements of the various drawings.

Figure 1A:
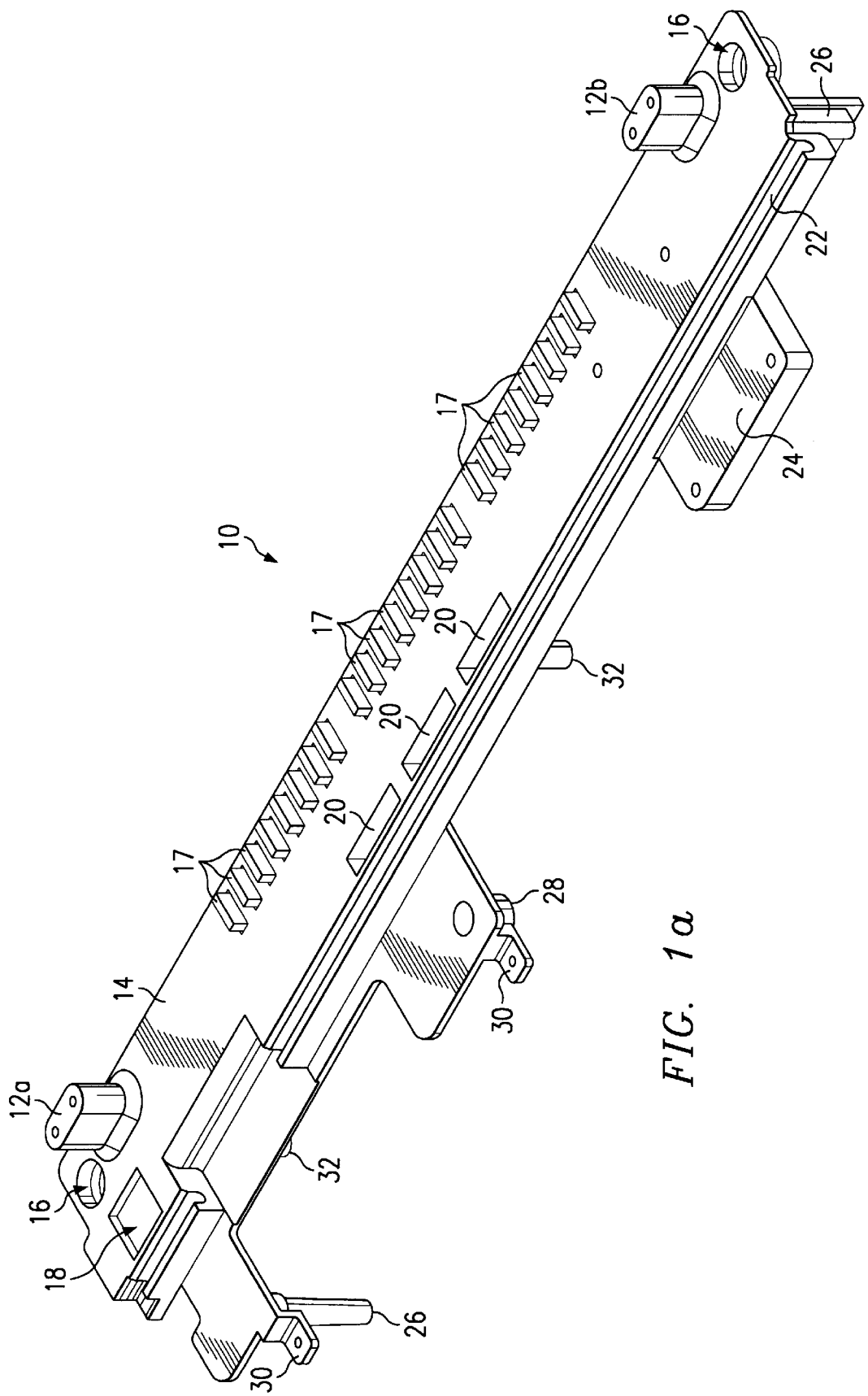
FIGS. 1a and 1b illustrate front and rear perspective views of a heat frame.
Figure 1B:
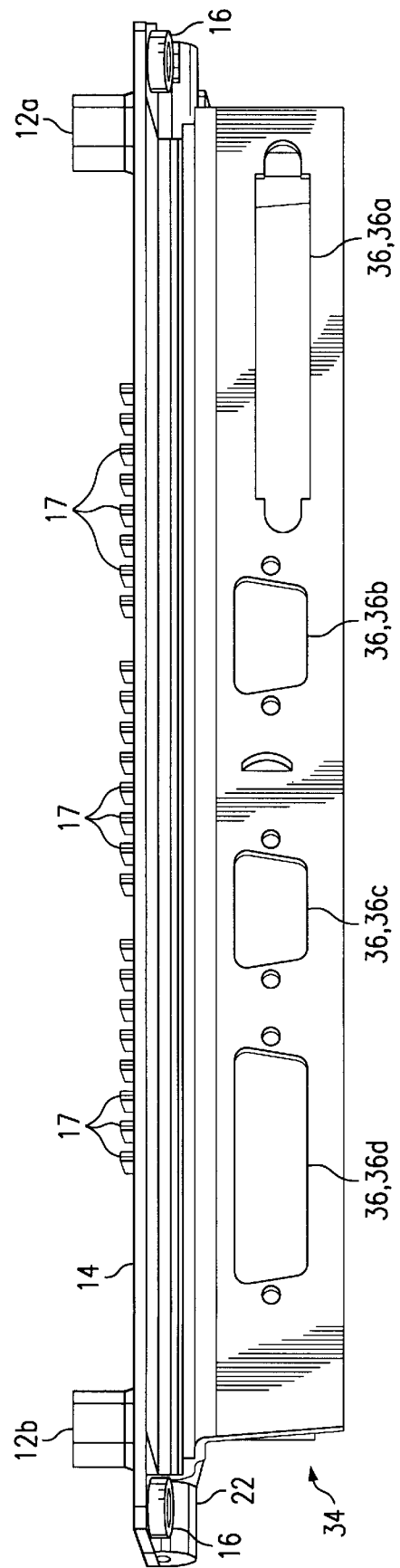

FIGS. 1a and 1b illustrate front and rear perspective views, respectively, of a heat frame for efficient heat transfer and for improved manufacturability of a portable computer.

Referring to FIG. 1a, the heat frame 10 is preferably formed from an integral piece of material such as magnesium or aluminum. The heat frame 10 includes display mounts 12a and 12b, for coupling to hinges on the display assembly of the notebook computer (see FIGS. 4 and 5), extending outwardly from a base surface 14. A plurality of fins 17 also extend outward from the base surface 14. Housing mounting holes 16 are formed through base surface 14 for receiving screws for connecting the heat frame 10 to a portion of the housing of the notebook computer (see FIG. 4). Pass-through opening 18 provides access to a user accessible control button. Light pipe openings 20 mount the light pipes carrying status indicators such as power-on, Num Lock, Caps Lock, hard drive access, and media bay drive access.

Heat pipe carrier 22 mounts a heat pipe, such as a copper tube having an enclosed fluid, for distributing heat across the entire heat frame. Heat pipes are available from a number of distributors including Thermacore, Inc. Heat sink 24 draws heat from the microprocessor (see FIG. 2).

Bottom board mounts 26 connect to a bottom circuit board to be mounted to the heat frame 10. Housing mount 28 connects to the exterior housing (see FIG. 4). Tabs 30 mount to an optional fourth circuit board to mounted to the heat frame 10. Mounts 32 connect to a Bus/VGA connector board (see FIG. 2).

Referring to FIG. 1b, the, connector bracket 34 is shown. The connector bracket 34 has a plurality of holes 36 for user accessible ports, such as the bus (docking station) port 36a, external VGA display connector port 36b, serial port 36c, and parallel port 36d.

The heat frame 10 is made from a unitary piece of material in the preferred embodiment. A good material for the heat frame is cast magnesium, which has good thermal conductivity properties at an extremely low weight. Another good choice is aluminum, which has superior thermal characteristics, but also weighs more than magnesium.

In use, the heat frame 10 accommodates four circuit boards, shown in greater detail hereinbelow. Other designs could use more or less boards to provide the electronics of the computer. Since the heat frame can hold all of the electronic boards in the computer, prior to full assembly of the computer, quality control testing can be performed on the electronics at an early stage. Testing prior to installation of the boards into the housing minimizes the costly disassembly of units to correct failures.

Along with the printed circuit board (PCB) mounting frame, the heat frame 10 integrates a heat sink 24, connector bracket 34, and hinge mounts 12 into one integral component. The unitary construction of this combination of parts provides significant advantages over other designs where multiple parts are used. First, labor and tooling assembly costs are greatly reduced, since the heat frame 10 eliminates many separate parts. Second, the cost of the heat frame 10 is less than the cost of separate components. Third, thermal efficiency is improved because the monolithic structure has better heat conduction than separate parts which are attached together and further improves thermal efficiency by spreading the heat across a much larger thermal conducting area without adding weight to the computer.

A heat pipe (shown assembled to the heat frame 10 in FIG. 3) is pressed into the heat pipe carrier 22 to distribute the heat generated by the circuit boards evenly across the heat frame 10. In particular, the heat pipe transfers heat from the area surrounding the heat sink 24 across the length of the heat frame to eliminate a hot spot in the area of the microprocessor.

Figure 5:
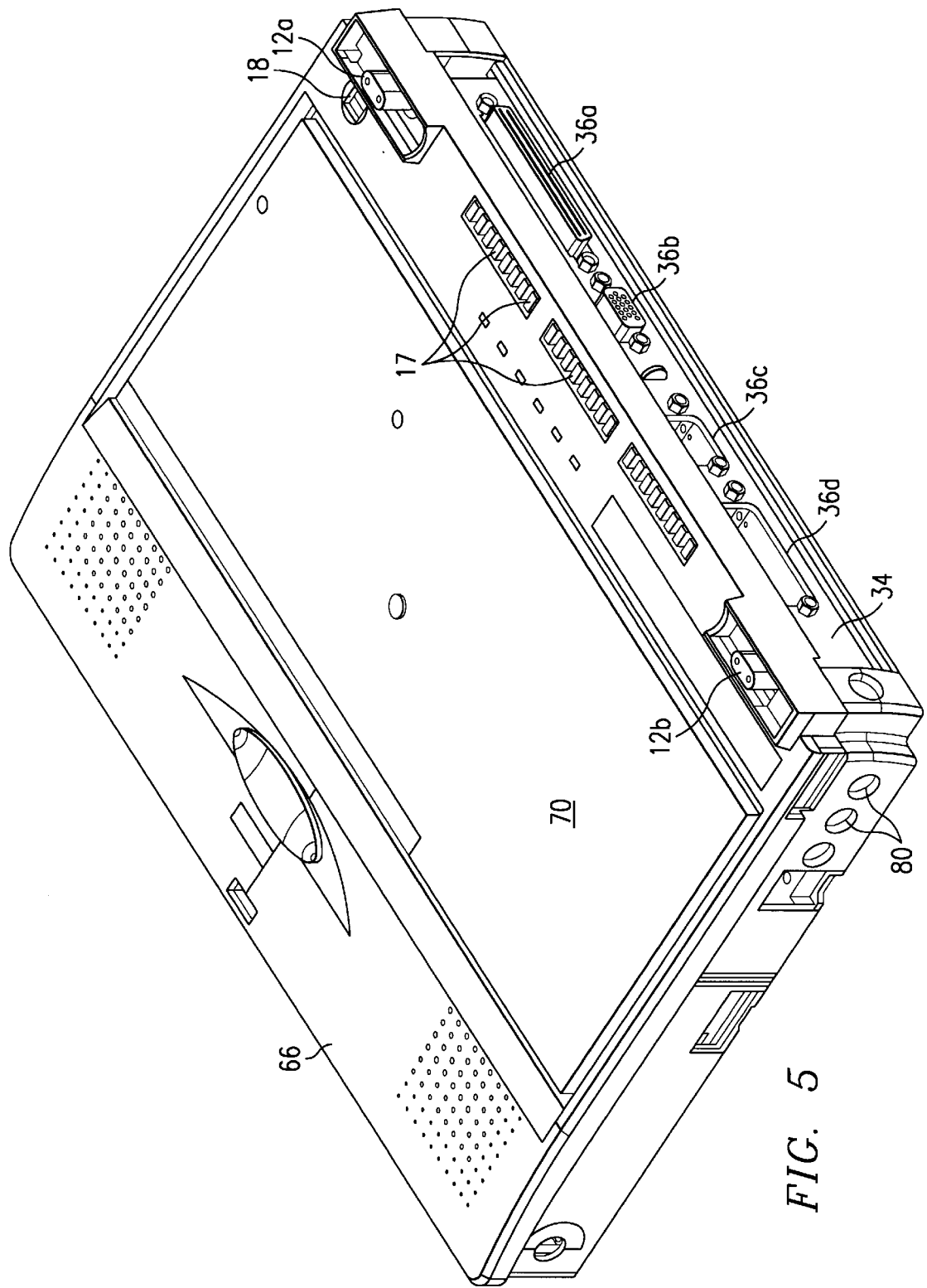
FIG. 5 illustrates an assembled notebook computer.

Fins 17 extend through the plastic housing (see FIG. 5). Since the fins are located directly beneath the rotational axis of the display, heat from within the housing is dissipated to ambient air in an area which is generally inaccessible to the user and does not interfere with operation of the computer.

The heat frame also serves as an EMI/RFI (electromagnetic interference/radio frequency interference) ground plane for the printed circuit boards. It has been found that grounding the circuit boards to the integrated structure of the heat frame 10 reduces EMI/RFI emissions.

Figure 2:
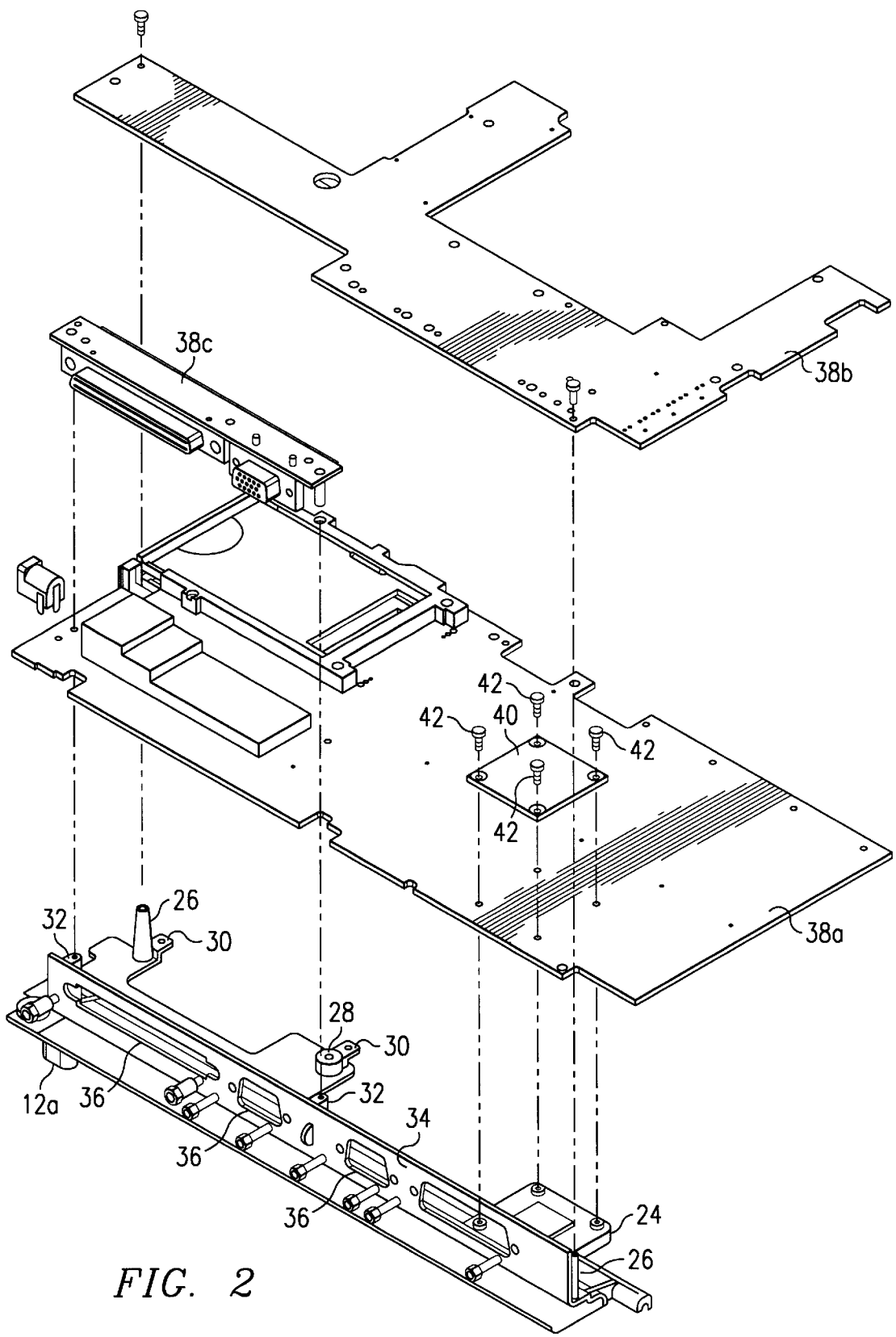
FIG. 2 illustrates an exploded view showing the assembly of circuit boards into the heat frame of FIG. 1.
Figure 3:
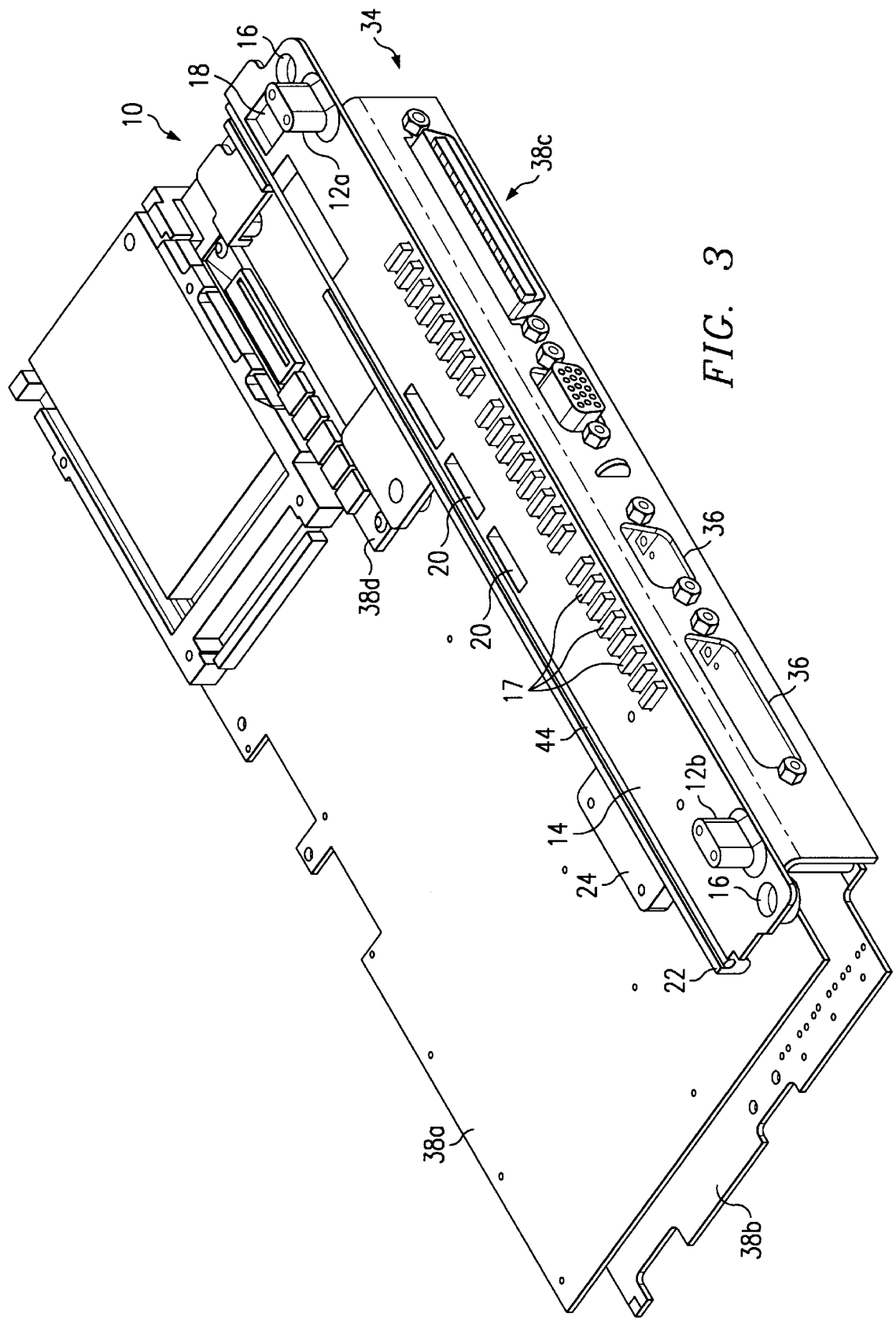
FIG. 3 illustrates a perspective view of circuit boards mounted on the heat frame.

FIG. 2 illustrates an exploded view showing the mounting of circuit boards 38 to the heat frame 10. Three boards, top board 38a, bottom board 38b and Bus/VGA board 38c are shown in FIG. 2 (a fourth board is shown in FIG. 3). The heat sink 24 mounts on the top circuit board 38a opposite the microprocessor. The heat sink is thermally coupled to the microprocessors by vias formed in the circuit board 38a. A thermal interface (not shown) is disposed between the heat sink 24 and the microprocessor to remove any air which would act as an insulating layer.

In the preferred embodiment, a microprocessor cover 40 covers the microprocessor. The microprocessor cover 40 is made of a heat conducting material, such as magnesium, to further carry heat away from the microprocessor and distribute the heat to the interior of the computer housing. In the preferred embodiment, the microprocessor cover 40 is coupled to the microprocessor using an aluminum impregnated silicon compound as a thermal interface. In testing, the microprocessor cover 40 has been found to reduce the temperature of the microprocessor by an additional four degrees. Bolts 42 fasten microprocessor cover 40 to heat sink 24.

The bottom circuit board 38b is fastened to heat frame 10 by mounts 26. The top board 38a and bottom board 38b are coupled by a board-to-board connector (not shown) or similar connector.

The Bus/VGA board 38c is coupled to the heat frame 10 by mounts 32. The Bus/VGA board 38c is coupled to the bottom board 38b by a flex cable (not shown).

In the illustrated embodiment, the top board 38a contains the microprocessor, memory, graphics controller and PCI bus circuitry. PC Card peripheral slot 43 is also connected to the top board 38a. Bottom board 38b contains the power supply circuitry, BIOS (basic input/output system), modem and modular bay circuitry. Bus/VGA board 38c provides connectors for the docking station and an external display. The allocation of functions between boards is a matter of design preference and the functions of the various boards mounted to the heat frame 10 could vary from that described herein.

FIG. 3 illustrates a top view of the circuit boards 38 assembled to the heat frame 10. As can be seen in this view, an optional fourth board 38d can be mounted to the heat frame 10. The heat pipe 44 is also shown mounted to the heat pipe carrier 22.

After the boards are mounted, as shown in FIGS. 2 and 3, the entire assembly can be tested through test nodes on the circuit boards 38. The bus connections can be tested through the docking station connector 36a. If any board is defective it can easily be replaced or repaired at this point. Thus, the cost of testing and repair is reduced.

Figure 4:
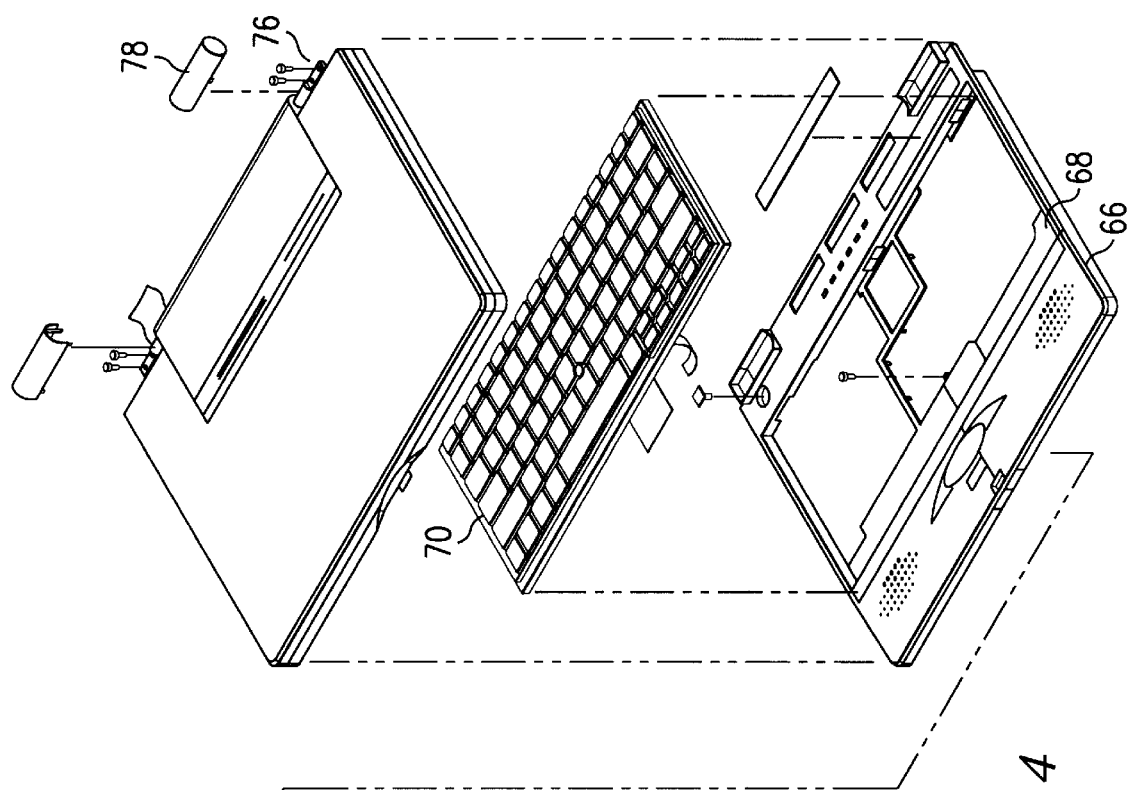
FIG. 4 illustrates an exploded view of assembly of a notebook computer using the heat frame.
Figure 4:
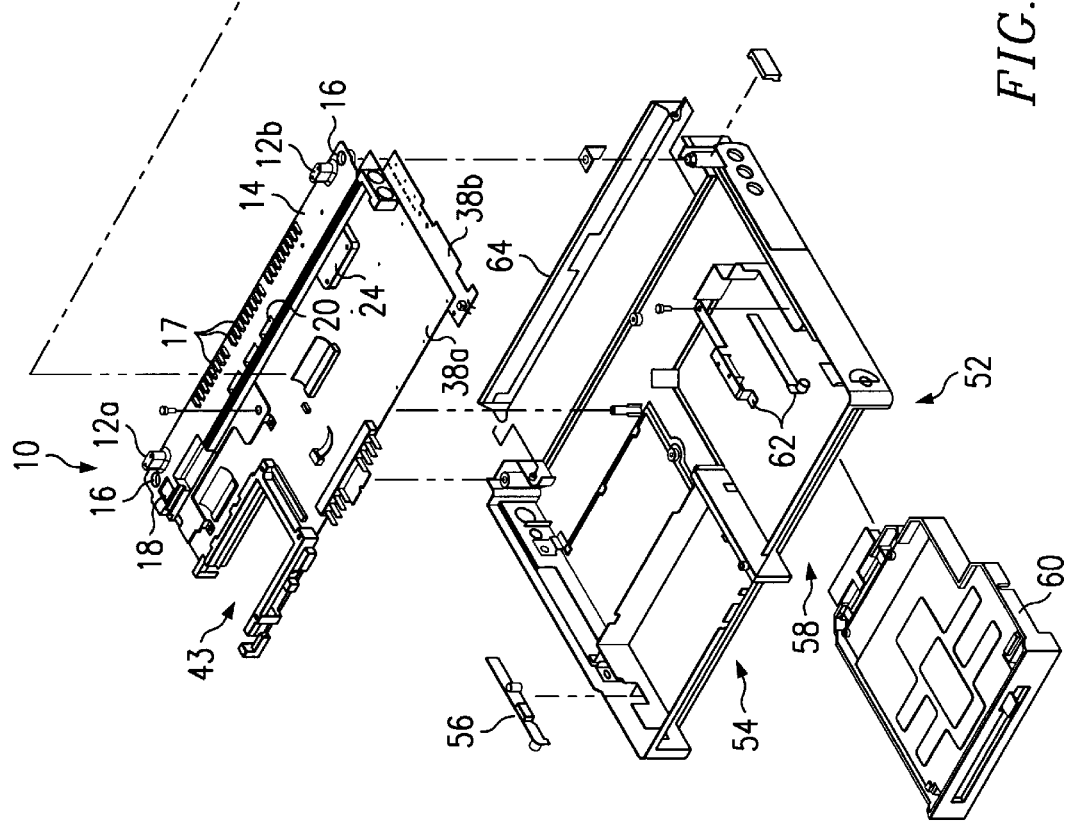

FIG. 4 illustrates an exploded view of a notebook computer 50 incorporating the heat frame 10 with attached boards 38. A bottom housing module 52 connects to mounts 16 and 28 on the heat frame 10. The bottom housing module 52 contains an opening 54 for a battery, along with mounting hardware 56 for receiving and ejecting the battery. A modular bay 58 can receive a peripheral device, such as a floppy drive 60 (shown) or CD-ROM. The modular bay 58 also includes mounting hardware 62 for receiving and retaining the peripheral device. A rotating cover 64 mounts on the bottom housing module 52 to cover the connector plate 34 while not in use.

A top housing module 66 forms an enclosure with the bottom housing module 52. A keyboard tray 68 in the top housing module 66 holds the keyboard 70 which connects to the top circuit board 38a via flex cables 72. The display assembly 74 is coupled to the display mounts 12a–b. The display assembly includes hinges 76 and hinge covers 78 which rotate to expose the display.

As can be seen from FIG. 4, the heat frame 10 allows for an uncomplicated assembly of the computer 50 after testing the circuit boards 38.

FIG. 5 illustrates a perspective view of an assembled computer 50 (with the display assembly removed to show the exposed portions of the heat frame 10). As can be seen, the fins 17 dissipate heat to the air at a point below the screen. This area is inaccessible to the user, increasing the safety of the computer 50. Also shown in this view are additional openings 80 in the bottom housing for connectors on the top circuit board 38a for audio in, audio out and microphone ports. Openings for the mouse and external keyboard ports are located on the other side of the bottom housing module 52.

The present invention provides significant advantages over the prior art. First, concentrations of heat around components such as the microprocessor are spread out over a large surface area to prevent hot spots. Second, the heat frame 10 draws heat away from areas which may be in contact with the user, such as the bottom surface of the housing which may rest on the user's lap. Third, heat is dissipated to the air in areas which are generally inaccessible to the user. Fourth, the heat frame reduces assembly and testing costs. Fifth, the heat frame provides a superior EMI/RFI ground plane.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the claims.

What is claimed is:

1. An electronic apparatus, comprising:

a plurality of circuit boards;

an elongated heat frame formed of an integral piece of material for holding said plurality of circuit boards in a horizontal orientation, a portion of said heat frame being thermally coupled to a processor for removing heat therefrom and spreading the heat throughout the heat frame; and a housing for containing said heat frame and circuit boards.

2. The electronic apparatus of claim 1 wherein said heat frame, is coupled to a heat pipe for distributing heat.

3. The electronic apparatus of claim 1 wherein said heat frame is formed from cast magnesium.

4. The electronic apparatus of claim 1 wherein said heat frame is formed from cast aluminum.

5. The electronic apparatus of claim 1 wherein said circuit boards are grounded to said heat frame.

6. The electronic apparatus of claim 1 and further comprising a display assembly rotatably mounted to said housing.

7. The electronic apparatus of claim 6 wherein said housing has an opening exposing said heat frame below an axis of rotation for said display assembly.

8. The electronic apparatus of claim 7 wherein said heat frame has a plurality of fins protruding through said opening.

9. The electronic apparatus of claim 1 wherein said heat frame is elongated along a horizontal axis.

10. The electronic apparatus of claim 9 further including a plurality of fins formed on said heat frame at an angle transverse to said horizontal axis.

11. The electronic apparatus of claim 10, wherein said plurality of fins are arranged in a substantially straight row along an upper surface of said heat frame.

12. The electronic apparatus of claim 1 wherein said processor is sandwiched between a heat dissipating cover for said processor and said heat frame.

13. The electronic apparatus of claim 2 wherein said heat pipe is fluid filled.

14. The electronic apparatus of claim 1 wherein said electronic apparatus is a portable computer.

* * * * *